(12) United States Patent
Yin et al.

(10) Patent No.: US 8,774,054 B2
(45) Date of Patent: Jul. 8, 2014

(54) NETWORK POLICY CONFIGURATION METHOD, MANAGEMENT DEVICE, AND NETWORK MANAGEMENT CENTER DEVICE

(71) Applicant: Huawei Tehcnologies Co., Ltd., Shenzhen (CN)

(72) Inventors: Yue Yin, Nanjing (CN); Wei Song, Nanjing (CN); Jin Li, Nanjing (CN); Xingfeng Jiang, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/159,891

(22) Filed: Jan. 21, 2014

(65) Prior Publication Data
US 2014/0133358 A1 May 15, 2014

Related U.S. Application Data

(63) Continuation of application No. PCT/CN2011/077852, filed on Aug. 1, 2011.

(51) Int. Cl.
*H04L 12/28* (2006.01)

(52) U.S. Cl.
USPC ........... 370/254; 370/419; 370/522; 709/220; 709/223

(58) Field of Classification Search
None
See application file for complete search history.

(56) References Cited

U.S. PATENT DOCUMENTS

| | | | |
|---|---|---|---|
| 2008/0108338 A1 | 5/2008 | Herrero et al. | |
| 2009/0150529 A1* | 6/2009 | Tripathi | 709/222 |
| 2009/0240790 A1* | 9/2009 | Utsunomiya et al. | 709/221 |
| 2009/0292858 A1* | 11/2009 | Lambeth et al. | 711/6 |
| 2010/0146093 A1 | 6/2010 | Kuik | |
| 2011/0029974 A1 | 2/2011 | Broyles et al. | |
| 2011/0103259 A1 | 5/2011 | Aybay et al. | |
| 2011/0238817 A1* | 9/2011 | Okita et al. | 709/224 |
| 2011/0289205 A1* | 11/2011 | Hansson et al. | 709/224 |
| 2013/0031235 A1 | 1/2013 | Yin et al. | |

FOREIGN PATENT DOCUMENTS

| | | |
|---|---|---|
| CN | 102055667 A | 5/2011 |
| CN | 102136931 A | 7/2011 |
| WO | 2009146165 A1 | 12/2009 |

OTHER PUBLICATIONS

"Edge Virtual Bridge Proposal," Version 0, Rev 0.1, Apr. 23, 2010, 72 pages.
Foreign Communication From A Counterpart Application, PCT Application No. PCT/CN2011/077852, English Translation of International Search Report dated May 10, 2012, 3 pages.

(Continued)

*Primary Examiner* — Kevin C Harper
(74) *Attorney, Agent, or Firm* — Conley Rose, P.C.; Grant Rodolph

(57) ABSTRACT

A network policy configuration method. The network policy configuration method includes: establishing correlation information between a virtual switch and physical network devices; when an operation event aimed at a virtual machine occurs, sending a first network policy configuration message aimed at the virtual machine to a virtual switch corresponding to the virtual machine, where the first network policy configuration message is used to instruct the virtual switch to perform network policy configuration; and acquiring, according to the correlation information, physical network devices correlated to the virtual switch, and sending second network policy configuration messages aimed at the virtual machine to the physical network devices correlated to the virtual switch, where the second network policy configuration messages are used to instruct the physical network devices to perform network policy configuration. The technical solution is capable of automatically configuring a network policy, thereby supporting the server virtualization technology.

8 Claims, 4 Drawing Sheets

(56) References Cited

OTHER PUBLICATIONS

Foreign Communication From A Counterpart Application, PCT Application No. PCT/CN2011/077852, English Translation of Written Opinion dated May 10, 2012, 19 pages.

Foreign Communication From A Counterpart Application, European Application No. 11858664.3, Extended European Search Report dated Apr. 7, 2014, 8 pages.

Okita, H., et al., "Virtual Network Management Information Model," draft-okita-ops-vnetmodel-04.txt, XP015074894, Mar. 14, 2011, 28 pages.

* cited by examiner

NETWORK POLICY CONFIGURATION METHOD, MANAGEMENT DEVICE, AND NETWORK MANAGEMENT CENTER DEVICE

CROSS-REFERENCE TO RELATED APPLICATIONS

This application is a continuation of International Application No. PCT/CN2011/077852, filed on Aug. 1, 2011, which is hereby incorporated by reference in its entirety.

TECHNICAL FIELD

Embodiments of the present invention relate to the field of network technologies, and in particular, to a network policy configuration method, a management device, and a network management center device.

BACKGROUND

Server virtualization abstracts logical resources from physical resources of a server and converts one server into several and even hundreds of virtual servers isolated from each other or converts multiple servers into one server.

A virtual machine (VM) refers to an emulated computer system that has complete hardware system functions and operates in a completely-isolated environment. A server may allow an operating virtual machine migrates from one server to another server to implement real-time migration of the virtual machine.

After a server is virtualized, traffic of multiple VMs may exist on one physical port of a switch. The switch needs to correspondingly configure different network policies for different VMs. With real-time migration of a virtual machine, a network policy on a corresponding switch also needs to migrate. The conventional manner of manually configuring a network policy by a network administrator is not applicable to the development trend of the server virtualization technology.

SUMMARY

Embodiments of the present invention provide a network policy configuration method, a management device, a network management center device, and a server management center device, which are capable of automatically configuring a network policy and support the server virtualization technology.

An embodiment of the present invention provides a network policy configuration method, including: establishing correlation information between a virtual switch and physical network devices; when an operation event aimed at a virtual machine occurs, sending a first network policy configuration message aimed at the virtual machine to a virtual switch corresponding to the virtual machine, where the first network policy configuration message is used to instruct the virtual switch to perform network policy configuration; and acquiring, according to the correlation information, physical network devices correlated to the virtual switch, and sending second network policy configuration messages aimed at the virtual machine to the physical network devices correlated to the virtual switch, where the second network policy configuration messages are used to instruct the physical network devices to perform network policy configuration.

An embodiment of the present invention further provides a management device, including: a first establishing module, configured to establish correlation information between a virtual switch and physical network devices; a first sending module, configured to, when an operation event aimed at a virtual machine occurs, send a first network policy configuration message aimed at the virtual machine to a virtual switch corresponding to the virtual machine, where the first network policy configuration message is used to instruct the virtual switch to perform network policy configuration; and a second sending module, configured to acquire, according to the correlation information, physical network devices correlated to the virtual switch, and send second network policy configuration messages aimed at the virtual machine to the physical network devices correlated to the virtual switch, where the second network policy configuration messages are used to instruct the physical network devices to perform network policy configuration.

An embodiment of the present invention further provides a server management center device, including: a third sending module, configured to, when an operation event aimed at a virtual machine occurs, send a first network policy configuration message aimed at the virtual machine to a virtual switch corresponding to the virtual machine, where the first network policy configuration message is used to instruct the virtual switch to perform network policy configuration; and a fourth sending module, configured to send a notification message that carries identifier information of the virtual machine, the identifier of the virtual switch, and the identifier of the operation event to a network management center device.

An embodiment of the present invention further provides a network management center device, including: a second establishing module, configured to establish correlation information between a virtual switch and physical network devices; a first receiving module, configured to receive a notification message that is sent by a server management center device and carries identifier information of the virtual machine, the identifier of the virtual switch, and the identifier of the operation event; and a fifth sending module, configured to acquire, according to the correlation information, physical network devices correlated to the virtual switch, and send second network policy configuration messages aimed at the virtual machine to the physical network devices correlated to the virtual switch, where the second network policy configuration messages are used to instruct the physical network devices to perform network policy configuration.

According to the network policy configuration method, the management device, the network management center device, and the server management center device that are provided in the embodiments of the present invention, when an operation event aimed at a virtual machine occurs, a first network policy configuration message aimed at the virtual machine is automatically sent to a virtual switch corresponding to the virtual machine, and second network policy configuration messages are sent to physical network devices correlated to the virtual switch. In this way, when an operation event aimed at the virtual machine occurs, policy configuration information can be sent to the virtual switch and the physical network devices correlated to the virtual switch in time, and policy configuration corresponding to the operation event is performed, thereby implementing adaptation to the virtualization technology.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

FIG. 1 is a schematic flowchart of a network policy configuration method according to an embodiment of the present invention.

DESCRIPTION OF EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. The described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
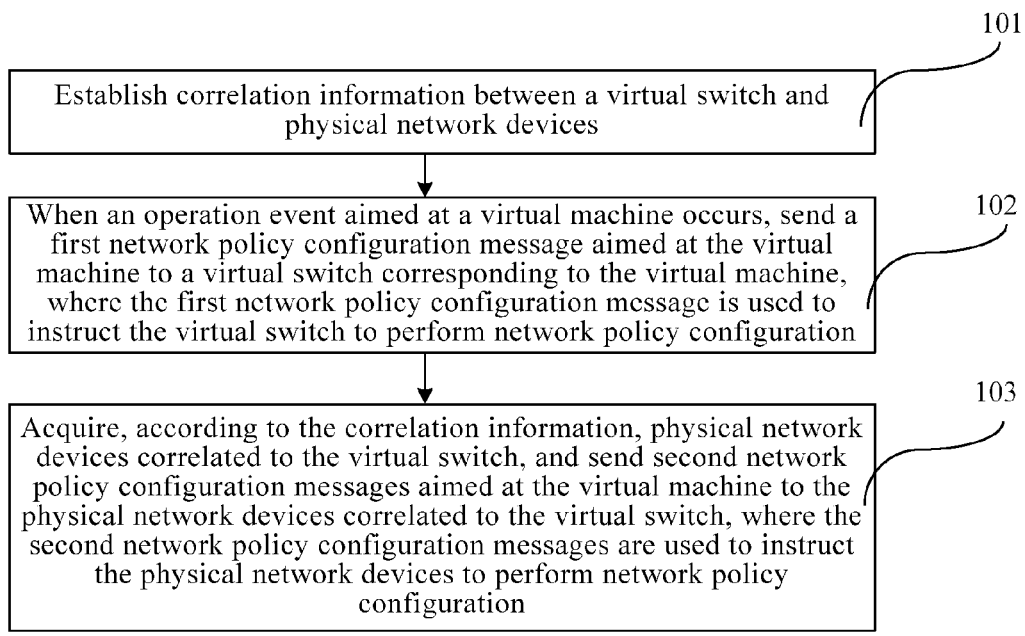

In view of a defect in the prior art that a manner of manually configuring a network policy fails to adapt to the virtualization technology, an embodiment of the present invention provides a technical solution for network policy configuration. FIG. 1 is a schematic flowchart of a network policy configuration method according to an embodiment of the present invention. As shown in FIG. 1, the method includes the following steps:

Step 101: Establish correlation information between a virtual switch and physical network devices.

A management device establishes correlation information between a virtual switch and physical network devices. In a specific embodiment, the correlation information may be a mapping between the identifier of the virtual switch and the identifiers of the physical network devices. Specifically, when a server management center device is distinguished from a network management center device, this step may be performed by the network management center device. When the server management center device is not distinguished from the network management center device, this step is performed by a unified management device. In this embodiment of the present invention, the server management center device, the network management center device, and the unified management device may specifically refer to a network management system that is capable of managing multiple servers. The network management system includes a processor and a display device. The processor is capable of implementing various operations in the technical solution of the present invention. The display device displays operating conditions of each server for network management personnel. The server management center device mainly manages the servers and virtual machines in the servers. The network management center device mainly manages physical network devices, and the physical network devices may provide physical network connections for the servers and the virtual machines in the servers to access a network. As an extended solution, the network management center device may further manage virtual switches in the servers. The unified management device is capable of implementing functions of both the server management center device and the network management center device.

Step 102: When an operation event aimed at a virtual machine occurs, send a first network policy configuration message aimed at the virtual machine to a virtual switch corresponding to the virtual machine, where the first network policy configuration message is used to instruct the virtual switch to perform network policy configuration.

Step 103: Acquire, according to the correlation information, physical network devices correlated to the virtual switch, and send second network policy configuration messages aimed at the virtual machine to the physical network devices correlated to the virtual switch, where when the correlation information is the mapping between the identifier of the virtual switch and the identifiers of the physical network devices, the identifiers of the physical network devices correlated to the virtual switch may be directly acquired according to the correlation in this step, and the second network policy configuration messages are used to instruct the physical network devices to perform network policy configuration.

In step 102 and step 103, when the server management center device is distinguished from the network management center device, the server management center device may send the first network policy configuration message aimed at the virtual machine to the virtual switch corresponding to the virtual machine, and the network management center device sends the second network policy configuration messages aimed at the virtual machine to the physical network devices correlated to the virtual switch; alternatively, the network management center device sends both the first network policy configuration message and the second network policy configuration messages. When the server management center device is not distinguished from the network management center device, the unified management device sends the first network policy configuration message and the second network policy configuration messages. In this embodiment of the present invention, a correlation is established between a virtual switch and physical network devices first; when an operation event aimed at a virtual machine occurs, a first network policy configuration message is then automatically sent to a virtual switch corresponding to the virtual machine, and second network policy configuration messages are sent to physical network devices correlated to the virtual switch, so as to instruct the virtual switch and the physical network devices correlated to the virtual switch to perform corresponding network policy configuration. In this way, when an operation event aimed at the virtual machine occurs, policy configuration corresponding to the operation event can be performed in time on the virtual switch and the physical network devices correlated to the virtual switch, thereby supporting the virtualization technology.

Figure 2:
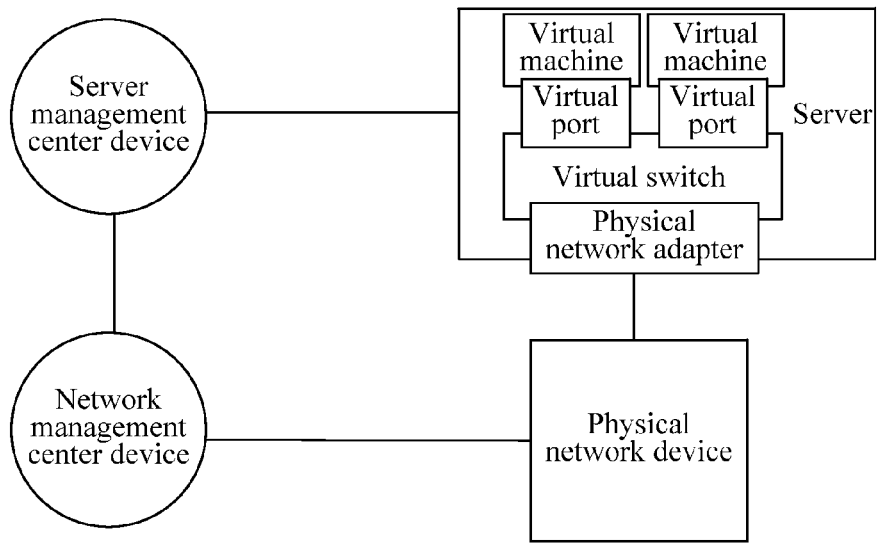
FIG. 2 is a schematic architecture diagram of a system according to an embodiment of the present invention.

Specifically, the operation event aimed at the virtual machine in this embodiment of the present invention may include a virtual machine creation event, a virtual machine deletion event, or a virtual machine migration event. FIG. 2 is a schematic architecture diagram of a system according to an embodiment of the present invention. As shown in FIG. 2, the system includes physical network devices, a server, a server management center device, and a network management center device. The server is connected to the physical network devices through a physical network adapter. Compared with a legacy server, a virtualized server is added with a virtual machine, a virtual switch, and a virtual port, where the virtual port is configured to connect the virtual switch and the virtual machine. The physical network devices connected to the physical network adapter include a switch, such as an access switch and an aggregation switch, and a gateway device.

In a specific embodiment of the present invention, before a first network policy configuration message is sent to a virtual switch and second physical network policy configuration messages are sent to physical network devices correlated to the virtual switch, a series of preparation may be performed, including establishing correlation information between each virtual switch and physical network devices. In addition, for network policy parameters that need to be configured on the virtual switch and the physical network devices correlated to the virtual switch, several network policy groups including the network policy information may be pre-established so that different network policy groups are selected during virtual machine creation. The network policy information in this embodiment is preset to indicate how to configure information about the network policy parameters on the virtual switch and the physical network devices. The network policy parameters are parameters that are actually configured on the virtual switch and the physical network devices for operating. An example is as follows:

Firstly, the network management center device creates a list of network policy groups in a local database. Specific network policy information may include virtual network policy information or physical network policy information. Therefore, each of the network policy groups includes the virtual network policy information and the physical network policy information, where the virtual network policy information is network policy information, such as a virtual local area network (VLAN) identifier and a bandwidth constraint, that is aimed at a virtual port of a specific VM and configured on a virtual switch; and the physical network policy information is network policy information, such as information about port isolation and enabling and disabling of Dynamic Host Configuration Protocol (DHCP) snooping, that is aimed at the virtual port of the specific VM and configured on the physical network devices correlated to the virtual switch. The details may be as illustrated in the following table:

| Policy Group Number | VLAN | Bandwidth constraint | Port Isolation | DHCP Snooping |
|---|---|---|---|---|
| Policy group 1 | 100 | 2M | Enable | Enable |
| Policy group 2 | 200 | 10M | Disable | Enable |
| Policy group 3 | 50 | 5M | Disable | Enable |

Secondly, the network management center device acquires information from each network element and further acquires network topology information. The network elements include the physical network devices and the virtual switch, and the network topology information includes information about the physical network devices on the network, information about the virtual switch on the network, information about paths between different physical network devices on the network, and information about paths between the physical network devices and the virtual switch on the network. Further, the correlation information between the virtual switch and the physical network devices may be established according to the network topology information. A physical network device in this embodiment of the present invention includes a switch or a gateway device.

Figure 3:
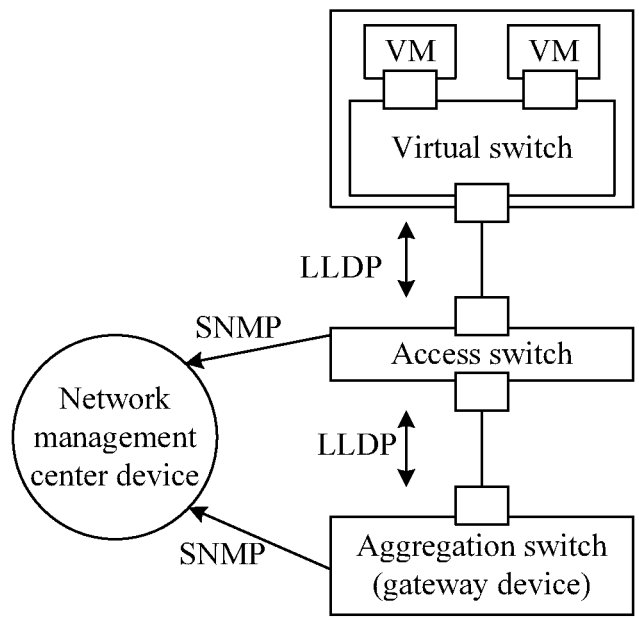
FIG. 3 is a schematic diagram of acquiring information by a network management center device from a network element according to an embodiment of the present invention.

For acquiring information by the network management center device from each network element, reference may be made to FIG. 3. The physical network devices, such as an access switch and an aggregation switch, discover each other over the Link Layer Discovery Protocol (LLDP) and store information of each other in a local management information base (MIB). Information stored in the MIB may include information such as a device vendor code, a device model, a device version number, and a hardware version number. The information stored in the MIB is sent to the network management center device over the Simple Network Management Protocol (SNMP). A physical network device such as an access switch and a virtual network device such as a virtual switch discover each other over LLDP or the Private Link Discovery Protocol, and the access switch stores information about the virtual switch into a local MIB and sends the information stored in the MIB to the network management center device over SNMP.

Figure 4:
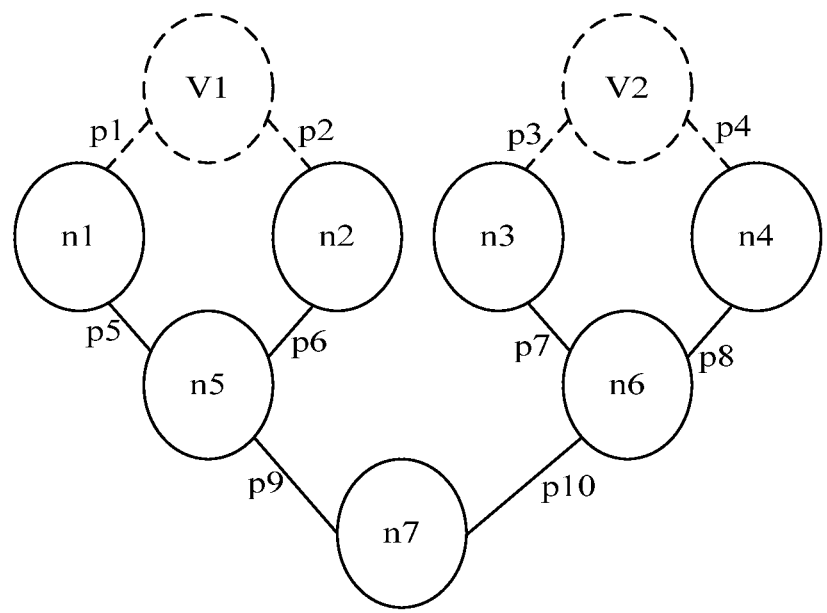
FIG. 4 is a schematic diagram of a network topology according to an embodiment of the present invention.

Then, the network management center device aggregates the information acquired from each network element to a network topology including physical network devices, virtual network devices, and path information. As shown in FIG. 4, the virtual network devices include virtual switches v1 and v2; the physical network devices are n1 to n7 and may specifically be an access switch, an aggregation switch, a gateway device, and the like; and paths between the virtual network devices and the physical network devices are p1 to p4, and paths between the physical network devices are p5 to p10.

Finally, the network management center device uses the identifier of a virtual switch as an index to generate a related resource list corresponding to the virtual switch. The related resource list includes physical network devices and paths correlated to the virtual switch, that is, a gateway device, physical network devices on a communication path between the gateway device and the virtual switch, and paths. That is, for virtual switch v1, physical network devices correlated to it are n1, n2, n5, and n7, and paths correlated to it are p1, p2, p5, p6, and p9; for virtual switch v2, physical network devices correlated to it are n3, n4, n6, and n7, and paths correlated to it are p3, p4, p7, p8, and p10. Multiple paths may exist between different device nodes, including between different physical network devices or between a virtual switch and a network device. Different paths correspond to different ports, and a corresponding network policy may be configured on each port. A specific form of the resource list may be as illustrated in the following table:

| Virtual switch Identifier | Identifiers of Correlated Physical network devices | Identifiers of Correlated Paths |
|---|---|---|
| v1 | n1, n2, n5, n7 | p1, p2, p5, p6, p9 |
| v2 | n3, n4, n6, n7 | p3, p4, p7, p8, p10 |

In addition, network topologies correlated to each virtual switch may further be added to the resource list, that is, a network topology from v1 to n7 illustrated in FIG. 4 is added for virtual switch v1, and a network topology from v2 to n7 illustrated in FIG. 4 is added for virtual switch v2.

Thirdly, the server management center device acquires resource information of all servers. The resource information includes the identifier of a server, location information of the server, identifiers of virtual switches in the server, and the like. The resource information may further include performance information of the server. The performance information of the server may include one or more of the current central processing unit (CPU) utilization, the number of VMs that have been created, the remaining maximum number of VMs that are capable of being created, and bandwidth utilization. The performance information allows a server with a relatively low load to be selected during VM creation, thereby achieving a load balance effect.

The preceding embodiment is a technical solution in which network policy groups and a resource list are pre-established. In addition, pre-establishment may not be performed; instead, virtual network policy information and physical network policy information are generated in real time when a virtual machine creation event occurs.

Figure 5:
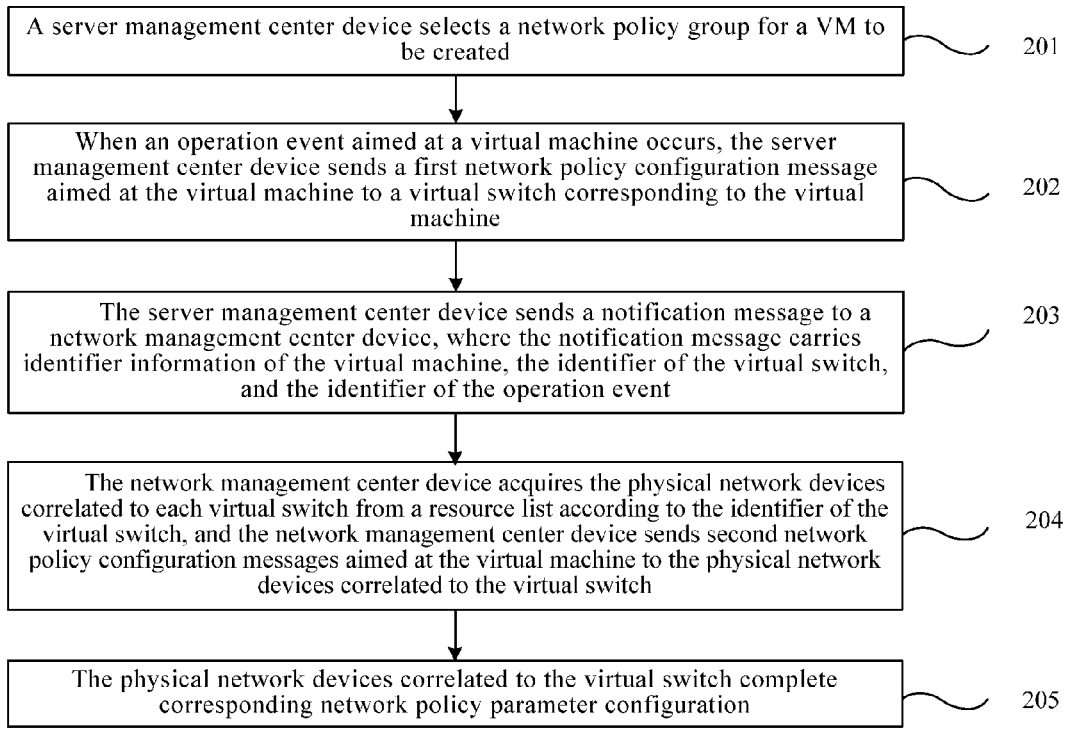
FIG. 5 is a schematic flowchart of a network policy configuration method according to an embodiment of the present invention.

Further, the server management center device may perform the network policy configuration method illustrated in FIG. 5:

Step 201: A server management center device selects a network policy group for a VM to be created. This step is performed in a situation in which a network policy group is established on a network management center device. If no network policy group is established, the network policy groups may be established in this step.

The server management center device may acquire network policy information aimed at a virtual port of a specific VM. For example, a network management center device may push a complete list of network policy groups to the server management center device. Then, the server management center device locally selects a network policy group such as policy group 2, and notifies a selection result to the network management center device. The server management center device may select a corresponding network policy group according to a type of a VM to be created. The type of the VM may include a Web server, a virtual office desktop, or a private firewall. When pushing a network policy group to the server management center device, the network management center device may perform annotation to specify which type of VMs the network policy group is suitable for, so that the server management center device selects an appropriate network policy group during creation. For another example, the server management center device may also access the list of network policy groups of the network management center device and selects one network policy group, such as policy group 2, from the list.

The server management center device may acquire virtual network policy information, such as information about VLAN and a bandwidth constraint, required for configuring a VM virtual port on a virtual switch, from the selected network policy group such as policy group 2, and then instructs a server to create the VM. The server management center device may send the virtual network policy information to a virtual switch on the server, so that the virtual switch completes network policy configuration for the VM virtual port. In addition, the server management center device may also negotiate a deployment location of the VM with the network management center device according to network policy information selected for the virtual machine. For example, a VM with a high priority may be deployed in a server with sufficient network resources. The virtual network policy information selected for the virtual machine may be indicated in the form of a network policy group.

Step 202: When an operation event aimed at a virtual machine occurs, the server management center device sends a first network policy configuration message aimed at the virtual machine to a virtual switch corresponding to the virtual machine.

Specifically, the operation event aimed at the virtual machine includes a virtual machine creation event, a virtual machine deletion event, or a virtual machine migration event. For the virtual machine creation event, the server management center device may correlate identifier information of a VM to be created and the identifier of a virtual switch to a selected network policy group, so as to facilitate information search when a deletion or migration event occurs on the virtual machine next time, and send, according to the network policy group acquired in step 201, a virtual network policy creation message carrying the network policy information and the identifier information of the VM to the virtual switch, where the virtual network policy creation message is a type of the first network policy configuration message and a message that is set for the virtual machine creation event. The identifier information of the VM may be the identifier of the VM, the identifier of a virtual port of the VM, or a media access control (MAC) address of the VM. The network policy information may be determined according to the network policy group selected in step 201 and may specifically include information such as a VLAN identifier and a bandwidth constraint. The virtual network policy creation message is used to instruct the virtual switch to configure network policy parameters for the virtual port of the virtual machine. In this embodiment, parameters such as a VLAN identifier and a bandwidth constraint may be configured.

In addition, if a virtual machine has been created, the operation event may be a virtual machine deletion event. In this case, the first network policy configuration message sent by the server management center device to the virtual switch is a virtual network policy deletion message, where the virtual network policy deletion message carries identifier information of the VM to instruct the virtual machine to delete network policy parameters that are previously configured for a virtual port corresponding to the virtual machine.

The operation event may also be a virtual machine migration event. A virtual switch connected to the virtual machine before the migration is a source virtual switch, and a virtual switch connected to the virtual machine after the migration is a target virtual switch. The sending a virtual network policy configuration message aimed at the virtual machine to a virtual switch corresponding to the virtual machine includes: sending, by the server management center device, a virtual network policy deletion message carrying the identifier information of the VM to the source virtual switch corresponding to the virtual machine, where the virtual network policy deletion message is used to instruct the virtual switch to delete network policy parameters that are previously configured for the virtual port of the virtual machine; and sending, by the server management center device, a virtual network policy creation message carrying the network policy information and the identifier information of the VM to the target virtual switch corresponding to the virtual machine, where the network policy information may include information such as a VLAN identifier and a bandwidth constraint, and the virtual network policy creation message is used to instruct the target virtual switch to configure network policy parameters, such as a VLAN identifier and a bandwidth constraint, for the virtual port of the virtual machine.

Step 203: The server management center device sends a notification message to the network management center device, where the notification message carries identifier information of the virtual machine, the identifier of the virtual switch, and the identifier of the operation event.

Specifically, for a case of virtual machine migration, the identifier of the virtual switch includes both the identifier of the source virtual switch before the migration and the identifier of the target virtual switch after the migration. If a virtual machine creation event occurs, the network management center device may further correlate identifier information of a newly created virtual machine (such as the identifier of the VM, the identifier of a virtual port of the VM, or a MAC address of the VM) and the identifier of a virtual switch to a network policy group, so as to facilitate information search when a deletion or migration event occurs on the virtual machine next time.

Step 204: The network management center device acquires, according to the identifier of the virtual switch, physical network devices correlated to the virtual switch from the resource list.

For a case of virtual machine migration, both physical network devices correlated to the source virtual switch and physical network devices correlated to the target virtual switch need to be acquired.

The network management center device sends second network policy configuration messages aimed at the virtual machine to the physical network devices correlated to the virtual switch.

Specifically, when the operation event aimed at the virtual machine is a virtual machine creation event, the sending second network policy configuration messages aimed at the virtual machine to the physical network devices correlated to the virtual switch includes sending a physical network policy creation message carrying the network policy information and the identifier information of the VM to the physical network devices correlated to the virtual switch, where the physical network policy creation message is a type of the second network configuration messages and is specifically a message set for the virtual machine creation event. Optionally, the network management center device may select appropriate network policy information according to types of the physical network devices that receive the physical network policy creation message. For example, a physical network policy creation message carrying the network policy information and the identifier information of the VM is sent to an access switch correlated to the virtual switch, where content of the network policy information may be determined according to the network policy group selected in step 201 and may specifically include information such as a VLAN identifier, a bandwidth constraint, port isolation, and DHCP snooping; a physical network policy creation message carrying the network policy information and the identifier information of the VM is sent to an aggregation switch correlated to the virtual switch, where the network policy information is determined according to the network policy group selected in step 201, and the network policy information may specifically include information such as a VLAN identifier and a bandwidth constraint; a physical network policy creation message carrying a VLAN identifier and the identifier information of the VM is sent to a gateway device correlated to the virtual switch. The physical network policy creation message is used to instruct each physical network device to configure network policy parameters on a local physical port corresponding to the virtual machine.

When the operation event aimed at the virtual machine is a virtual machine deletion event, the sending second network policy configuration messages aimed at the virtual machine to the physical network devices correlated to the virtual switch includes: sending a physical network policy deletion message carrying the identifier information of the VM to the physical network devices correlated to the virtual switch, where the physical network policy deletion message is a type of the second network policy configuration messages and is specifically a message set for the virtual machine deletion event. For example, a physical network policy deletion message is sent to the access switch, the aggregation switch, and the gateway device that are correlated to the virtual switch each, where the physical network policy deletion message is used to instruct the access switch, the aggregation switch, and the gateway device to delete network policy parameters that are previously configured for the virtual port of the virtual machine.

When the operation event aimed at the virtual machine is a virtual machine migration event, the sending a physical network policy configuration message aimed at the virtual machine to the physical network devices correlated to the virtual switch includes: sending a physical network policy deletion message carrying the identifier information of the virtual machine to the physical network devices correlated to the source virtual switch, for example, sending a physical network policy deletion message to an access switch, an aggregation switch, and a gateway device that are correlated to the source virtual switch each, where the physical network policy deletion message carries identifier information of the virtual port and is used to instruct the access switch, the aggregation switch, and the gateway device to delete network policy parameters that are previously configured for the virtual port of the virtual machine; and sending a physical network policy creation message carrying the network policy information and the identifier information of the VM to the physical network devices correlated to the target virtual switch, for example, sending a physical network policy creation message carrying the network policy information and the identifier information of the VM to an access switch correlated to the target virtual switch, where the network policy information may include information such as a VLAN identifier, a bandwidth constraint, port isolation, and DHCP Snooping; sending a physical network policy creation message carrying the network policy information and the identifier information of the VM to an aggregation switch or a gateway device correlated to the target virtual switch, where the network policy information may include information such as a VLAN identifier and a bandwidth constraint; and sending a physical network policy creation message carrying a VLAN identifier and the identifier information of the VM to a gateway device correlated to the target virtual switch.

Step 205: The physical network devices correlated to the virtual switch complete corresponding network policy parameter configuration.

Specifically, each physical network device may perform corresponding network policy parameter configuration after receiving the physical network policy creation information. For example, the access switch configures network policy parameters, such as a VLAN identifier, a bandwidth constraint, port isolation, and DHCP Snooping, on a corresponding port according to the identifier information of the VM. The aggregation switch configures network policies, such as a VLAN identifier and a bandwidth constraint, on a corresponding port according to the identifier information of the VM. The gateway device adjusts policies, such as firewall and load balance, for the VM according to the VLAN identifier and the identifier information of the VM, where the adjusting firewall and load balance are not included in the aforementioned network policy group, but are a policy that is managed by the network device itself. The network device only needs to know, according to the received identifier information of the VM, which VM has been created and which VM has been deleted, so that the firewall or load balance can be adjusted for the VM.

After receiving the physical network policy deletion message sent by the network management device, each physical network device releases, according to the identifier information of the VM carried in the physical network policy deletion message, a network policy that is related to the VM and previously configured.

In the foregoing embodiment of the present invention, when an operation event aimed at a virtual machine occurs, a server management center device sends a first network policy configuration message aimed at the virtual machine to a virtual switch, and then sends a notification message to a network management center device, so that the network management center device sends second network policy configuration messages to physical network devices. The present invention further provides another implementation manner, that is, the network management center device is responsible for both sending the first network policy configuration message to the virtual switch and sending the second network policy configuration messages to the physical network devices. Specifically, when step 202 is performed, if an operation event aimed at the virtual machine occurs, the server management center device does not directly send the first network policy configuration message to the virtual network switch corresponding to the virtual machine; instead, step 203 is directly performed, that is, the server management center device sends a notification message carrying the identifier information of the virtual machine, the identifier of the virtual switch, and the identifier of the operation event to the network management center device. Then, when performing step 204, the network management center device not only sends a first network policy configuration message aimed at the virtual machine to a virtual switch corresponding to the virtual machine, but also acquires, according to the identifier of the virtual switch, physical network devices correlated to the virtual switch from the correlation information between the virtual switch and the physical network devices, and then sends second network policy configuration messages aimed at the virtual machine to the physical network devices. In addition, for a case in which only a unified management device is set, the notification procedure in step 203 may not be performed; instead, the unified management device performs the step of sending the first network policy configuration message to the virtual switch in step 202 and the step of sending the second network policy configuration messages to the physical network devices in step 204.

Figure 6:
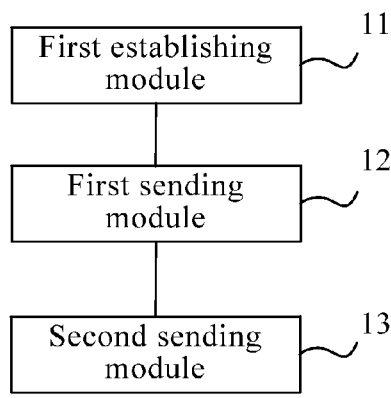
FIG. 6 is a schematic structural diagram of a network device according to an embodiment of the present invention.

Corresponding to the preceding method embodiment, an embodiment of the present invention further provides a management device. FIG. 6 is a schematic structural diagram of a management device according to an embodiment of the present invention. As shown in FIG. 6, the device includes a first establishing module 11, a first sending module 12, and a second sending module 13, where the first establishing module 11 is configured to establish correlation information between a virtual switch and physical network devices; the first sending module 12 is configured to, when an operation event aimed at a virtual machine occurs, send a first network policy configuration message aimed at the virtual machine to a virtual switch corresponding to the virtual machine, where the first network policy configuration message is used to instruct the virtual switch to perform network policy configuration; and the second sending module 13 is configured to acquire, according to the correlation information, physical network devices correlated to the virtual switch, and send second network policy configuration messages aimed at the virtual machine to the physical network devices correlated to the virtual switch, where the second network policy configuration message is used to instruct the physical network devices to perform network policy configuration.

In this embodiment, the management device may be formed by a processor, a memory, a data bus, and the like in physical structure, and the processor specifically implements functions of the management device in the technical solution of the present invention. Specifically, when a unified management device performs network policy configuration, adaption to the virtualization technology may be implemented by pre-establishing correlation information between a virtual switch and physical network devices on a network, automatically sending policy configuration information to a virtual switch and physical network devices correlated to the virtual switch when an operation event aimed at a virtual machine occurs, and performing policy configuration corresponding to the operation event.

In the embodiment, when the operation event aimed at the virtual machine is a virtual machine creation event, the first network policy configuration message sent by the first sending module 12 to the virtual switch is a virtual network policy creation message carrying network policy information and identifier information of the VM, where the network policy information includes a VLAN identifier and a bandwidth constraint, and the virtual network policy creation message is used to instruct the virtual switch to configure network policy parameters for a virtual port of the virtual machine. When the operation event aimed at the virtual machine is a virtual machine deletion event, the first network policy configuration message sent by the first sending module 12 to the virtual switch is a virtual network policy deletion message, where the virtual network policy deletion message carries the identifier information of the VM and is used to instruct the virtual switch to delete network policy parameters that are previously configured for the virtual port of the virtual machine. When the operation event aimed at the virtual machine is a virtual machine migration event, the first sending module 12 sends the virtual network policy deletion message to a source virtual switch corresponding to the virtual machine and the virtual network policy creation message to a target virtual switch corresponding to the virtual machine.

Figure 7:
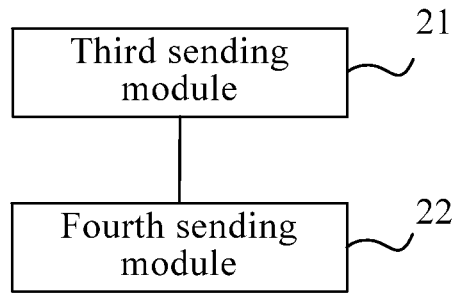
FIG. 7 is a schematic structural diagram of a server management center device according to an embodiment of the present invention.

In addition, the second sending module 13 is specifically configured to send, when the operation event aimed at the virtual machine is a virtual machine creation event, physical network policy creation messages carrying network policy information and identifier information of the virtual machine to the physical network devices correlated to the virtual switch, where the physical network policy creation messages are used to instruct each physical network device to configure network policy parameters on a local physical port corresponding to the virtual machine; send, when the operation event aimed at the virtual machine is a virtual machine deletion event, physical network policy deletion messages carrying the identifier information of the virtual machine to the physical network devices correlated to the virtual switch, where the physical network policy deletion messages are used to instruct the physical network devices to delete network policy parameters that are previously configured for a virtual port of the virtual machine; and send, when the operation event aimed at the virtual machine is a virtual machine migration event, the physical network policy deletion messages to physical network devices correlated to a source virtual switch and the physical network policy creation messages to physical network devices correlated to a target virtual switch. In this embodiment of the present invention, a server management center device may send the first network policy configuration message to the virtual switch corresponding to the virtual machine, and a network management center device may send the second network policy configuration messages to the physical network devices correlated to the virtual switch. For details, refer to the embodiments illustrated in FIG. 7 and FIG. 8. FIG. 7 is a schematic structural diagram of a server management center device according to an embodiment of the present invention. As shown in FIG. 7, the device includes a third sending module 21 and a fourth sending module 22. The third sending module 21 is configured to, when an operation event aimed at a virtual machine occurs, send a first network policy configuration message aimed at the virtual machine to a virtual switch corresponding to the virtual machine, where the first network policy configuration message is used to instruct the virtual switch to perform network policy configuration. When a specific operation event aimed at the virtual machine occurs, the third sending module 21 may accordingly send a message as the first sending module 12 in the preceding embodiment. The fourth sending module 22 is configured to send a notification message that carries identifier information of the virtual machine, the identifier of the virtual switch, and the identifier of the operation event to a network management center device.

Figure 8:
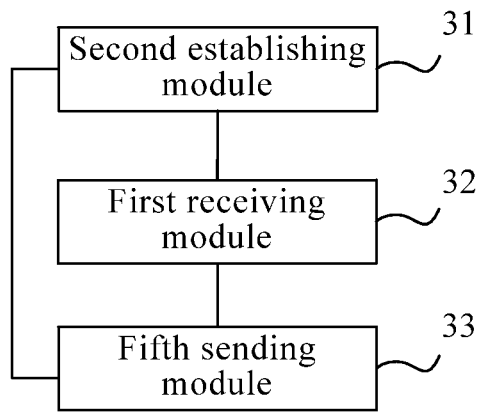
FIG. 8 is a schematic structural diagram of a network management center device according to a first embodiment of the present invention.

In this embodiment, the server management center device may be formed by a processor, a memory, a data bus, and the like in physical structure, and the processor specifically implements functions of the server management center device in the technical solution of the present invention. FIG. 8 is a schematic structural diagram of a network management center device according to a first embodiment of the present invention. As shown in FIG. 8, the device includes a second establishing module 31, a first receiving module 32, and a fifth sending module 33. The second establishing module 31 is configured to establish correlation information between a virtual switch and physical network devices; the first receiving module 32 is configured to receive the notification message that is sent by the server management center device and carries identifier information of the virtual machine, the identifier of the virtual switch, and the identifier of the operation event; and the fifth sending module 33 is configured to acquire, according to the correlation information, physical network devices correlated to the virtual switch, and send second network policy configuration messages aimed at the virtual machine to the physical network devices correlated to the virtual switch, where the second network policy configuration message is used to instruct the physical network devices to perform network policy configuration. When a specific operation event aimed at the virtual machine occurs, the fifth sending module 33 may accordingly send a message as the second sending module 13 in the preceding embodiment. In this embodiment, the network management center device may be formed by a processor, a memory, a data bus, and the like in physical structure, and the processor specifically implements functions of the network management center device in the technical solution of the present invention.

When an operation event aimed at a virtual machine occurs, the server management center device and the network management center device are capable of automatically sending policy configuration information to a virtual switch and physical network devices correlated to the virtual switch and performing policy configuration corresponding to the operation event, thereby implementing adaptation to the virtualization technology.

Figure 9:
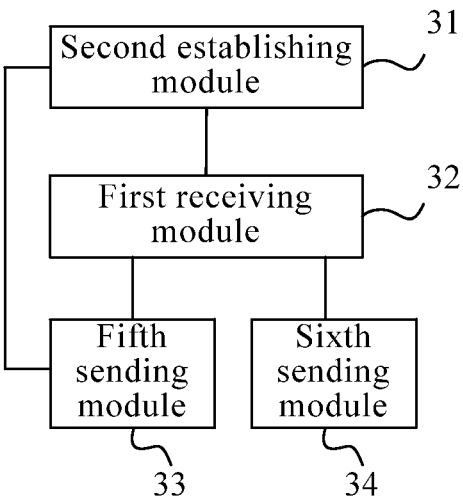
FIG. 9 is a schematic structural diagram of a network management center device according to a second embodiment of the present invention.

Different from the embodiments illustrated in FIG. 7 and FIG. 8, a network management center device may send both the first network policy configuration message and the second network policy configuration messages. Specifically, FIG. 9 is a schematic structural diagram of a network management center device according to a second embodiment of the present invention. As shown in FIG. 9, the network management center device further includes a sixth sending module 34 in addition to the second establishing module 31, the first receiving module 32, and the fifth sending module 33. The sixth sending module is configured to, when an operation event aimed at a virtual machine occurs, send a first network policy configuration message aimed at the virtual machine to a virtual switch corresponding to the virtual machine, where the first network policy configuration message is used to instruct the virtual switch to perform network policy configuration. A server management center device cooperating with the network management center device in this embodiment does not need to send a first network policy configuration message when the operation event aimed at the virtual machine occurs; instead, it directly sends a notification message to the network management center device in this embodiment, and the network management center device directly sends a first network policy configuration message and second network policy configuration messages. In this way, when the operation event aimed at the virtual machine occurs, policy configuration corresponding to the operation event is performed on a virtual switch and physical network devices correlated to the virtual switch in time, thereby supporting the virtualization technology. In this embodiment, the network management center device may be formed by a processor, a memory, a data bus, and the like in physical structure, and the processor specifically implements functions of the network management center device in the technical solution of the present invention.

Persons of ordinary skill in the art may understand that all or a part of the steps in the method embodiments may be implemented by a program instructing relevant hardware. The program may be stored in a computer readable storage medium. When the program is run, the steps in the method embodiments are performed. The storage medium may be any medium that is capable of storing program codes, such as a read-only memory (ROM), a random-access memory (RAM), a magnetic disk, or an optical disk.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, as long as such modifications or replacements do not cause the essence of corresponding technical solutions to depart from scope of the technical solutions of the embodiments of the present invention.

What is claimed is:
1. A network policy configuration method, comprising:
establishing correlation information between a virtual switch and physical network devices;
sending a virtual network policy deletion message carrying the identifier information of the virtual machine to a source virtual switch corresponding to the virtual machine when a virtual machine migration event aimed at a virtual machine occurs, wherein the virtual network policy deletion message is used to instruct the source virtual switch to delete virtual network policy parameters that are previously configured for a first virtual port between the virtual machine and the source virtual switch;
sending a virtual network policy creation message carrying virtual network policy information and the identifier information of the virtual machine to a target virtual switch corresponding to the virtual machine when the virtual machine migration event occurs, wherein the virtual network policy creation message is used to instruct the target virtual switch to configure virtual network policy parameters for a second virtual port between the virtual machine and the target virtual switch according to the virtual network policy information;

acquiring, according to the correlation information, physical network devices correlated to the source virtual switch, and physical network devices correlated to the target virtual switch;

sending physical network policy deletion messages carrying the identifier information of the virtual machine to the physical network devices correlated to the source virtual switch, wherein the physical network policy deletion messages are used to instruct the physical network devices to delete physical network policy parameters that are previously configured for the first virtual port between the virtual machine and the source virtual switch; and sending physical network policy creation messages carrying physical network policy information and the identifier information of the virtual machine to physical network devices correlated to the target virtual switch, wherein the physical network policy creation messages are used to instruct each of the physical network devices to configure physical network policy parameters for the second virtual port between the virtual machine and the target virtual switch on a local physical port corresponding to the virtual machine.

2. The network policy configuration method according to claim 1, wherein establishing correlation information between the virtual switch and the physical network devices comprises:

acquiring, by a management device, network topology information, wherein the network topology information comprises information about physical network devices on a network, information about a virtual switch on the network, information about paths between different physical network devices on the network, and information about paths between the physical network devices and the virtual switch on the network; and establishing, by the management device, the correlation information between the virtual switch and the physical network devices according to the network topology information.

3. The network policy configuration method according to claim 1, wherein sending the virtual network policy deletion message carrying the identifier information of the virtual machine to a source virtual switch corresponding to the virtual machine comprises sending, by a management device, virtual network policy deletion message carrying the identifier information of the virtual machine to a source virtual switch corresponding to the virtual machine, wherein sending the virtual network policy creation message carrying virtual network policy information and the identifier information of the virtual machine to the target virtual switch corresponding to the virtual machine comprises sending, by the management device, the virtual network policy creation message carrying virtual network policy information and the identifier information of the virtual machine to a target virtual switch corresponding to the virtual machine, wherein acquiring, according to the correlation information, the physical network devices correlated to the source virtual switch, and the physical network devices correlated to the target virtual switch comprises:

acquiring, by the management device, the physical network devices correlated to the source virtual switch from the correlation information between the virtual switch and the physical network devices according to the identifier of the source virtual switch; and acquiring, by the management device, the physical network devices correlated to the target virtual switch from the correlation information between the virtual switch and the physical network devices according to the identifier of the target virtual switch;

wherein sending the physical network policy deletion messages carrying the identifier information of the virtual machine to the physical network devices correlated to the source virtual switch comprises sending, by the management device, the physical network policy deletion messages carrying the identifier information of the virtual machine to the physical network devices correlated to the source virtual switch, and wherein sending the physical network policy creation messages carrying the physical network policy information and the identifier information of the virtual machine to the physical network devices correlated to the target virtual switch comprises sending, by the management device, the physical network policy creation messages carrying the physical network policy information and the identifier information of the virtual machine to the physical network devices correlated to the target virtual switch.

4. The network policy configuration method according to claim 1, wherein sending the virtual network policy deletion message carrying the identifier information of the virtual machine to the source virtual switch corresponding to the virtual machine comprises sending, by a server management center device, the virtual network policy deletion message carrying the identifier information of the virtual machine to a source virtual switch corresponding to the virtual machine, wherein sending the virtual network policy creation message carrying virtual network policy information and the identifier information of the virtual machine to the target virtual switch corresponding to the virtual machine comprises sending, by the server management center device, the virtual network policy creation message carrying virtual network policy information and the identifier information of the virtual machine to a target virtual switch corresponding to the virtual machine, wherein before acquiring the physical network devices correlated to the source virtual switch, and the physical network devices correlated to the target virtual switch, the method further comprises sending, by the server management center device, a notification message that carries identifier information of the virtual machine, the identifier of the source virtual switch and the identifier of the target virtual switch, and the identifier of the virtual machine migration event to a network management center device, wherein acquiring, according to the correlation information, the physical network devices correlated to the source virtual switch, and the physical network devices correlated to the target virtual switch comprises:

acquiring, by the network management center device, the physical network devices correlated to the source virtual switch from the correlation information between the virtual switch and the physical network devices according to the identifier of the source virtual switch; and acquiring, by the network management center device, the physical network devices correlated to the target virtual switch from the correlation information between the virtual switch and the physical network devices according to the identifier of the target virtual switch, wherein sending the physical network policy deletion messages carrying the identifier information of the virtual machine to the physical network devices correlated to the source virtual switch comprises sending, by the network management center device, the physical network policy deletion messages carrying the identifier information of the virtual machine to the physical network devices correlated to the source virtual switch, and wherein sending the physical network policy creation messages carrying the physical network policy information and the identifier information of the virtual machine to the physical network devices correlated to the target virtual switch comprises sending, by the network management center device, the physical network policy creation messages carrying physical network policy information and the identifier information of the virtual machine to physical network devices correlated to the target virtual switch.

5. The network policy configuration method according to claim 1, wherein when the virtual machine migration event aimed at the virtual machine occurs and before the sending the virtual network policy deletion message and the virtual network policy creation message, the method further comprises sending, by a server management center device, a notification message that carries identifier information of the virtual machine, the identifier of the source virtual switch and the identifier of the target virtual switch, and the identifier of the virtual machine migration event to a network management center device, wherein sending the virtual network policy deletion message carrying the identifier information of the virtual machine to the source virtual switch corresponding to the virtual machine comprises sending, by the network management center device, the virtual network policy deletion message carrying the identifier information of the virtual machine to a source virtual switch corresponding to the virtual machine, wherein sending the virtual network policy creation message carrying virtual network policy information and the identifier information of the virtual machine to the target virtual switch corresponding to the virtual machine comprises sending, by the network management center device, the virtual network policy creation message carrying virtual network policy information and the identifier information of the virtual machine to a target virtual switch corresponding to the virtual machine, wherein acquiring, according to the correlation information, the physical network devices correlated to the source virtual switch, and the physical network devices correlated to the target virtual switch comprises:

acquiring, by the network management center device, the physical network devices correlated to the source virtual switch from the correlation information between the virtual switch and the physical network devices according to the identifier of the source virtual switch; and acquiring, by the network management center device, the physical network devices correlated to the target virtual switch from the correlation information between the virtual switch and the physical network devices according to the identifier of the target virtual switch, wherein sending the physical network policy deletion messages carrying the identifier information of the virtual machine to the physical network devices correlated to the source virtual switch comprises sending, by the network management center device, the physical network policy deletion messages carrying the identifier information of the virtual machine to the physical network devices correlated to the source virtual switch, and wherein the sending physical network policy creation messages carrying the physical network policy information and the identifier information of the virtual machine to the physical network devices correlated to the target virtual switch comprises sending, by the network management center device, the physical network policy creation messages carrying physical network policy information and the identifier information of the virtual machine to the physical network devices correlated to the target virtual switch.

6. A management device, comprising:
a processor;
a memory coupled to the processor; and
a data bus coupled to the processor, wherein the processor is configured to:

establish correlation information between a virtual switch and physical network devices; send a virtual network policy deletion message carrying the identifier information of the virtual machine to a source virtual switch corresponding to the virtual machine when a virtual machine migration event aimed at a virtual machine occurs, wherein the virtual network policy deletion message is used to instruct the source virtual switch to delete virtual network policy parameters that are previously configured for a first virtual port between the virtual machine and the source virtual switch;

send a virtual network policy creation message carrying virtual network policy information and the identifier information of the virtual machine to a target virtual switch corresponding to the virtual machine when the virtual machine migration event occurs, wherein the virtual network policy creation message is used to instruct the target virtual switch to configure virtual network policy parameters for a second virtual port between the virtual machine and the target virtual switch according to the virtual network policy information;

acquire, according to the correlation information, physical network devices correlated to the source virtual switch, and physical network devices correlated to the target virtual switch;

send physical network policy deletion messages carrying the identifier information of the virtual machine to the physical network devices correlated to the source virtual switch, wherein the physical network policy deletion messages are used to instruct the physical network devices to delete physical network policy parameters that are previously configured for the first virtual port between the virtual machine and the source virtual switch; and send physical network policy creation messages carrying physical network policy information and the identifier information of the virtual machine to physical network devices correlated to the target virtual switch, wherein the physical network policy creation messages are used to instruct each of the physical network devices to configure physical network policy parameters for the second virtual port between the virtual machine and the target virtual switch on a local physical port corresponding to the virtual machine.

7. The management device according to claim 6, wherein establishing correlation information between the virtual switch and the physical network devices comprises:
acquiring network topology information, wherein the network topology information comprises information about physical network devices on a network, information about a virtual switch on the network, information about paths between different physical network devices on the network, and information about paths between the physical network devices and the virtual switch on the network; and
establishing the correlation information between the virtual switch and the physical network devices according to the network topology information.

8. A network management center device, comprising:
a processor;
a memory coupled to the processor; and
a data bus coupled to the processor, wherein the processor is configured to:
establish correlation information between a virtual switch and physical network devices;
receive a notification message sending by a server management center device when a virtual machine migration event aimed at a virtual machine occurs, wherein the notification message carries identifier information of the virtual machine, the identifier of a source virtual switch corresponding to the virtual machine and the identifier of a target virtual switch corresponding to the virtual machine, and the identifier of the virtual machine migration event;
send a virtual network policy deletion message carrying the identifier information of the virtual machine to the source virtual switch, wherein the virtual network policy deletion message is used to instruct the source virtual switch to delete virtual network policy parameters that are previously configured for a first virtual port between the virtual machine and the source virtual switch;
send a virtual network policy creation message carrying virtual network policy information and the identifier information of the virtual machine to the target virtual switch, wherein the virtual network policy creation message is used to instruct the target virtual switch to configure virtual network policy parameters for a second virtual port between the virtual machine and the target virtual switch according to the virtual network policy information;
acquire, according to the correlation information, physical network devices correlated to the source virtual switch, and physical network devices correlated to the target virtual switch;
send physical network policy deletion messages carrying the identifier information of the virtual machine to the physical network devices correlated to the source virtual switch, wherein the physical network policy deletion messages are used to instruct the physical network devices to delete physical network policy parameters that are previously configured for the first virtual port between the virtual machine and the source virtual switch; and
send physical network policy creation messages carrying physical network policy information and the identifier information of the virtual machine to physical network devices correlated to the target virtual switch, wherein the physical network policy creation messages are used to instruct each of the physical network devices to configure physical network policy parameters for the second virtual port between the virtual machine and the target virtual switch on a local physical port corresponding to the virtual machine.

* * * * *